United States Patent
Busse et al.

(10) Patent No.: US 12,311,944 B2
(45) Date of Patent: May 27, 2025

(54) METHOD, DEVICE AND COMPUTER PROGRAM PRODUCT FOR THE RESTRAINED MOVEMENT OF A VEHICLE

(71) Applicant: Volkswagen Aktiengesellschaft, Wolfsburg (DE)

(72) Inventors: Oliver Busse, Wolfsburg (DE); Christian Zink, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 177 days.

(21) Appl. No.: 17/834,800

(22) Filed: Jun. 7, 2022

(65) Prior Publication Data
US 2022/0396268 A1 Dec. 15, 2022

(30) Foreign Application Priority Data

Jun. 11, 2021 (DE) .................. 102021205969.4

(51) Int. Cl.
*B60W 30/00* (2006.01)
*B60W 10/04* (2006.01)
(Continued)

(52) U.S. Cl.
CPC ...... *B60W 30/18009* (2013.01); *B60W 10/04* (2013.01); *B60W 10/18* (2013.01);
(Continued)

(58) Field of Classification Search
CPC ........... B60W 30/18009; B60W 10/04; B60W 10/18; B60W 2520/04; B60W 2710/18;
(Continued)

(56) References Cited

U.S. PATENT DOCUMENTS

| 2007/0027598 A1 | 2/2007 | Mori et al. |
| 2007/0096556 A1* | 5/2007 | Kokubo ............ B60T 8/268 303/155 |

(Continued)

FOREIGN PATENT DOCUMENTS

| CN | 203516548 U | 4/2014 |
| CN | 107237848 B | 1/2019 |

(Continued)

OTHER PUBLICATIONS

Machine Translation of DE102008006480A (Year: 2009).*

(Continued)

*Primary Examiner* — Anne Marie Antonucci
*Assistant Examiner* — Jordan T Smith
(74) *Attorney, Agent, or Firm* — Peter Zura; LOZA & LOZA, LLP (57) ABSTRACT

Technologies and techniques for the restrained movement of a vehicle with a drive unit for accelerating the vehicle, and a braking unit for braking the vehicle. A restraining drive torque is generated by the drive unit, and a braking torque is generated by the braking unit to compensate for the restraining drive torque and thereby to generate a restraining torque in the vehicle, and braking the vehicle by reducing the drive torque. A device and a computer program product may be configured to implement the restraining movement processes and a storage may be configured with a processor to execute the computer program product.

20 Claims, 4 Drawing Sheets

(51) Int. Cl.
  *B60W 10/18* (2012.01)
  *B60W 30/18* (2012.01)

(52) U.S. Cl.
  CPC ..... *B60W 2520/04* (2013.01); *B60W 2710/18* (2013.01); *B60W 2720/106* (2013.01)

(58) Field of Classification Search
  CPC ..... B60W 2720/106; B60W 30/18063; B60W 10/184; B60W 30/18109; B60W 30/06; B60D 1/06; B60D 1/62; B60D 1/36; B60T 8/1708; B60T 8/248; B60T 8/323; B60T 2230/06; B60T 7/20; B60T 7/12; B60T 8/321
  See application file for complete search history.

(56) References Cited

U.S. PATENT DOCUMENTS

| | | | |
|---|---|---|---|
| 2009/0025996 A1* | 1/2009 | Inoue | B60W 10/184 180/179 |
| 2017/0043778 A1* | 2/2017 | Kelly | B60W 30/143 |
| 2017/0113700 A1* | 4/2017 | Kaneko | B60T 7/22 |
| 2017/0297575 A1* | 10/2017 | Das | B60W 10/02 |
| 2022/0017056 A1* | 1/2022 | Takeya | F16D 65/18 |
| 2023/0347870 A1* | 11/2023 | Hipkin | B60W 30/182 |

FOREIGN PATENT DOCUMENTS

| | | | |
|---|---|---|---|
| CN | 209041379 U | 6/2019 | |
| DE | 102006000367 A1 | 2/2007 | |
| DE | 102006043618 A1 | 3/2008 | |
| DE | 102008006480 A1 * | 8/2009 | ........... B60T 13/662 |
| DE | 102009028505 A1 | 2/2011 | |
| DE | 102009047127 A1 | 5/2011 | |
| DE | 102017204636 A1 | 10/2017 | |
| DE | 102017205209 A1 | 10/2018 | |
| DE | 102017218669 A1 | 4/2019 | |
| FR | 2828450 A1 | 2/2003 | |
| FR | 2856449 A1 | 12/2004 | |
| FR | 2921882 A1 | 4/2009 | |
| GB | 2457162 B | 8/2009 | |

OTHER PUBLICATIONS

DE Application No. 102021205969.4. Examination Report (Dec. 8, 2021).
EP Serial No. 22172523.7. Extended Search Report (Nov. 11, 2022).

* cited by examiner

METHOD, DEVICE AND COMPUTER PROGRAM PRODUCT FOR THE RESTRAINED MOVEMENT OF A VEHICLE

RELATED APPLICATIONS

The present application claims priority to German Patent App. No. 10 2021 205 969.4, filed on Jun. 11, 2021, the contents of which is incorporated by reference in its entirety herein.

TECHNICAL FIELD

The present disclosure relates to a method and a device for the targeted maneuvering of a vehicle at low speeds in a small space. The present disclosure further relates to a computer program product to implement such a method as well as a storage means on which such a computer program product is stored.

BACKGROUND

In various situations, vehicles must be maneuvered particularly slowly and accurately. This applies, for example, to maneuvering when parking, when driving over a curb and when coupling the vehicle to the tow bar of a trailer. In order to enable the slow and targeted movement of the vehicle without error, driving skill and/or supportive electronics are required. Furthermore, it is desirable if the driving maneuver can be realized with the highest possible degree of driver comfort. Known driver assistance systems may be derived from, for example CN 107237848 B and FR 2856449 A1.

In the known systems, it is customarily attempted to regulate the vehicle's acceleration through a corresponding drive torque and the braking or hesitation of the vehicle through a braking torque. However, the known solutions are often burdened with a certain latency. Generic brakes as an actuator for the hesitation are relatively imprecise, and burdened to a great extent by latency, since here volume must be displaced physically before the desired braking effect is realized. Furthermore, the braking effect is subject to a certain fading, which is subject to various environmental factors such as the ambient temperature, so that the ability to regulate is further complicated.

SUMMARY

The technical problem of the present disclosure is to at least partially take into account the above-described problem. In particular, the present disclosure provides a method and a device for a more precise movement of a vehicle in a small space.

Advantages of the present disclosure are described in the features recited in the claims, as well as the description and the figures. These apply to features that are described in connection with the methods, devices and computer program product according to the present disclosure, the storage means according to the present disclosure and in each case conversely, so that with respect to the disclosure concerning the individual aspects of the present disclosure reference is always made and/or can be made reciprocally.

According to some aspects of the present disclosure, a method for the restrained movement of a vehicle with a drive unit to accelerate the vehicle and a braking unit to brake the vehicle is provided. In some examples, a method is disclosed, comprising generating a restraining drive torque by the drive unit; generating a braking torque by the braking unit to compensate for the restraining driving torque and thereby to generate a restraining torque in the vehicle; and braking the vehicle through reduction of a drive torque.

With the restraining defined or a corresponding restraining torque between the drive torque and the braking torque, a targeted and precise regulation of the acceleration and the speed and the distance traveled by the vehicle derived therefrom can be achieved. Latency losses through a build-up of pressure in the braking unit are thus prevented. Furthermore, by means of the low latency during the braking process a high degree of driver comfort and driver safety can be achieved.

According to another aspect of the present disclosure a device for the restrained movement of a vehicle according to one of the methods described herein may be provided. The device may comprise a drive unit to accelerate the vehicle, a braking unit to brake the vehicle, and a setting unit to set the restraining torque by means of the drive unit and the braking unit as well as to brake the vehicle by means of the braking unit. Accordingly, the device brings with it the same advantages as were described in detail with respect to the method disclosed herein. The braking unit may be configured with a friction brake that is customary for vehicles, particularly road vehicles such as a passenger car or a truck. The acceleration unit preferably has a generic drive train or is configured as part of the drive train. The setting unit has in particular a generic vehicle control unit or is configured as part of such a vehicle control unit.

Furthermore, a computer program product is provided that includes commands that upon the execution of the computer program product by a computer cause the latter to execute the methods described in detail by means of a device as described herein. The computer or processing device may be regarded as a vehicle control device, and may be configured as a part of the vehicle control device or in addition to the vehicle control device, and may have other functional components as well. The computer program product may be implemented as a computer-readable instruction code in any suitable programming language and/or machine language such as, for example, in JAVA, C++, C# and/or Python. The computer program product may be stored on a computer-readable storage medium such as a data disc, a removable drive, a volatile or non-volatile memory or a built-in memory/processor. The instruction code may program a computer or other programmable devices such as the vehicle control device in such a way that the desired functions are executed. Furthermore, the computer program product be provided and/or be in a network such as the internet, from which it can be downloaded as needed by a user. The computer program product may be realized and/or be made both by means of software and by means of one or multiple special electronic interfaces, i.e., in hardware or in any hybrid form, i.e., by means of software components and hardware components.

Moreover, within the scope of the present disclosure a computer-readable storage means is proposed on which a computer program as described above in detail is stored. The storage means is in particular provided in the form of a non-volatile storage means. In this way the storage means according to the present disclosure and the computer program product bring with them the advantages described above.

Further measures that improve the present disclosure result from the description below of various exemplary embodiments of the present disclosure that are schematically represented in the figures. All the features and/or advantages arising from the claims, the description or the figures, including design particulars and spatial arrangements can be essential to the present disclosure both in and of themselves and in the various combinations.

BRIEF DESCRIPTION OF THE DRAWINGS

The following are shown, in each case schematically.

DETAILED DESCRIPTION

Elements with the same function and mode of action are in each case provided with the same reference numbers in the figures.

The method according to the present disclosure is implemented in some examples for shunting and/or parking, preferably for electronically assisted shunting and/or parking of the vehicle. In these driving maneuvers, quick and precise stopping is important. In assisted shunting and/or parking processes, particularly high demands are made today with respect to the precision of the braking actuation. With the techniques disclosed herein, the compliance with, for example, the maximum stopping distance desired for a parking function, can be ensured.

The restrained movement of the vehicle can be understood as movement of the vehicle in which at the same time the restraining drive torque and the braking torque are applied with the same magnitude, but with different signs, are applied to the associated components in the vehicle, while the vehicle is moved with the additional drive torque. At the same time, the braking torque can be understood as a positive braking torque. The compensation of the restraining drive torque can be understood to the effect that the braking torque is generated at least to the extent that it balances out the restraining drive torque. The braking torque thus has at least the extent of the restraining drive torque, with the other sign. The drive torque that is reduced to brake the vehicle can be understood as the restraining drive torque or an additional drive torque that can be termed an acceleration drive torque. Instead of generating an acceleration drive torque, the restraining drive torque can also be amplified beyond the level that is generated for the desired restraining torque. The restraining drive torque and the acceleration drive torque are both generated by the drive unit and here are identified differently, in particular to better delineate the different torque levels. The braking torque can also be understood as a restraining braking torque. Consequently, the breaking torque is not to be understood as being restricted to the effect that by means of the braking torque the vehicle is brought to a standstill. Rather, the braking torque according to the present disclosure is to be used to generate the restraining torque.

The braking of the vehicle can be understood as a slowing and/or deceleration of the vehicle, possibly to a standstill of the vehicle. This means that braking is not to be regarded as restricted to a pure braking process in which exclusively braking torque is effected. In some examples, during the braking or deceleration of the vehicle to the extent possible, the braking torque and the restraining drive torque, i.e., the restraining torque, are always effected. The braking unit includes in particular the vehicle's brake, in particular in the form of a friction brake.

By way of analogy to the restrained movement of the vehicle, one might imagine that a driver of the vehicle would stand with one foot on the brake and, with the other foot, equalize the braking torque thereby imparted using the driving or gas pedal, so that any resulting acceleration as well as the speed of the vehicle remain unchanged. Thus, if the vehicle gathers speed, the braking torque can be imparted and, parallel to that, the drive torque can be increased by the same "negative" amount. Thus, for example, if a user function within the scope of a parking assistant or coupling assistant for coupling the vehicle to a tow bar of a trailer requires a negative target acceleration, then solely by the reduction of the drive torque the vehicle can be slowed to a standstill quickly, precisely and without latency losses.

The braking torque is preferably required or generated as long as the vehicle is in motion and/or until the vehicle is once again at a standstill. The braking torque may also be added to an already-existing drive torque and/or acceleration drive torque and in regulation as a consistent offset on a drive path. In this way the vehicle's drive train can be driven in a defined manner against the braking unit. This process, which at first glance appears contradictory, results in the decisive advantage that by taking away the vehicle's drive torque, as described above, the vehicle can be slowed particularly quickly and without latency. A further advantage results in that a higher degree of effectiveness of the brake with regard to the pressure gradient achievable is attained and a higher positioning precision of the drive is made possible through displacement to a more easily regulated operating point outside a minimum load.

In order to end the shunting or parking process, the vehicle is first brought to a standstill using a negative target acceleration or braking. As soon as the vehicle is at a standstill, the restraint can be reduced or the restraining torque released. The braking torque will preferably be set as higher than the restraining drive torque. In this way it can be ensured that even after completion of the braking and/or at a standstill the vehicle can be reliably held in the desired position. Aside from that, any unanticipated acceleration of the vehicle can always be prevented.

In some examples, the restraining drive torque and the braking torque can be generated simultaneously or one after the other. That means that compensating for the restraining drive torque by the braking torque can also be understood as compensating for the braking torque by the retraining drive torque. Preferably, the braking torque may be generated first, and then or nearly simultaneously (e.g., still during the generation of the braking torque), the restraining drive torque. The braking torque and the restraining drive torque can be built up simultaneously during an acceleration process to accelerate the vehicle to generate the restraining torque.

In some examples, the vehicle may be accelerated by means of an acceleration drive torque and then the restraining torque is generated. Thus, the desired acceleration and/or desired speed can be set first, and then the desired restraining torque can be imparted. This manner of proceeding offers the advantage that, without stopping the vehicle, a vehicle can transition directly into the restrained operation and the subsequent regulating to brake the vehicle. In practice, a user function, such as an intelligent parking assistant or a trailer coupling assistant, can be activated first. As soon as the function specifies a positive target acceleration and the vehicle gathers speed or has gathered speed, the restraining torque can be generated.

In some examples, the restraining torque may be generated when the vehicle is at a standstill, and then an acceleration drive torque is generated to accelerate the vehicle. With this, an unanticipated acceleration and/or unanticipated braking of the vehicle during the driving maneuver can be prevented. During the generation of the restraining torque, a short-term excessive increase in the braking torque or the restraining drive torque may occur, from which a corresponding braking or acceleration process may result. This can be prevented or at least reduced in that the restraining torque is first built up when the vehicle is at a standstill, in particular with a predefined excessive braking torque, e.g., a braking torque that at least during the standstill is always slightly greater than the restraining drive torque.

In some examples, the braking torque may be modified, depending on a variably set restraining drive torque and/or depending on a variably set acceleration drive torque. Depending on how the restraining drive torque and/or the acceleration drive torque is modified or can be modified, the braking torque can also be modified and/or regulated. The braking torque and the resulting restraining torque may be calculated as slope-dependent or dependent upon the slope on which the vehicle is standing or moving. Thus, a reliable slowing or braking of the vehicle to a standstill can be made possible exclusively by lowering a drive torque. The dependent modification and/or setting of the braking toque can be understood in that the braking torque is dynamically regulated depending on the variably set and/or varying restraining and/or drive torque and/or depending on the variably set and/or varying acceleration drive torque. Aside from that, the restraining drive torque and/or the acceleration drive torque may be dynamically modified or regulated depending on the set and/or varying braking torque. The various torques may thus in particularly be continuously adjusted to the respective driving situation, for example if the slope of the ground under the vehicle is different, then braking or acceleration is to be carried out. In the event that the set restraining torque is not sufficient, then for example additional braking torque can be required on the braking unit.

In some examples, the restraining torque may be reduced when the vehicle is at a standstill. Thus, unanticipated acceleration and/or braking processes during the vehicle's drive can be at least largely prevented. In particular the respective driving maneuver can thereby be implemented with a high degree of driving comfort and a high degree of driving safety. Here it may be of further advantage if during the restrained movement the vehicle's speed is limited to a value lower than 2 km/h, in particular lower than 1 km/h. Thus, there is no need to modify the set restraining torque during the drive.

In some examples, a vehicle, using acceleration drive torque, can be accelerated for a driving maneuver to position the vehicle, in particular for a shunting and/or parking process in a predefined holding position to a speed lower than 10 km/h, in particular lower than 5 km/h. In this way it can be ensured that the restraining torque becomes or is sufficiently low to, for example, prevent damage to the vehicle and/or prevent uncontrolled movement of the vehicle. If, for example, the vehicle is to be moved by means of a parking process conducted by an intelligent parking assistant in a restrained manner, the restrained operation or the restrained movement of the vehicle can be limited to no more than 4 km/h. Here, after activation of the parking assistant while stationary a basic restraining torque can be built up with the startup process. The restraining torque can be continuously increased during the acceleration process until the basic restraining torque has been achieved. This process may, as mentioned above, be increased slope-dependent up to an applicative determined value.

In order to generate the restraining torque, the braking torque may be generated with a greater torque generating gradient than the restraining drive force. This means that braking torque is built up or generated more quickly and/or intensely than the restraining drive torque. In this way, the unanticipated acceleration of the vehicle can be prevented. Furthermore, in this way accidents that may occur, for example, through a delayed braking process and/or an intense acceleration process can be prevented. A possible short-term standstill of the vehicle can be taken into account by means of a gradient limit of the braking torque, which results in a continuous ramping up or increase in the restraining torque. Here it may be of further advantage if for the drive torque a greater gradient limit is set than for the braking torque.

In some examples, it may be advantageous to remove or to reduce the restraining torque the braking torque is reduced with a lower torque reduction gradient than the restraining drive torque. In this manner, it can be achieved that there is always sufficient braking torque to reliably prevent any unanticipated acceleration of the vehicle. Aside from that, a reliable standstill of the vehicle can be ensured. In some examples, the generation of the braking torque may be started chronologically before the generation of the restraining torque in order to generate the restraining torque. In other words, the drive torque can be built up as chronologically slowed compared to the braking torque. Here, too, a gradient limit on the braking torque can be implemented in order to prevent any undesirable acceleration of the vehicle. For removing the restraining torque, it is further possible that a reduction of the braking torque is started chronologically after a reduction of the restraining drive torque. In this way the aforementioned advantages can be achieved analogously.

Figure 1:
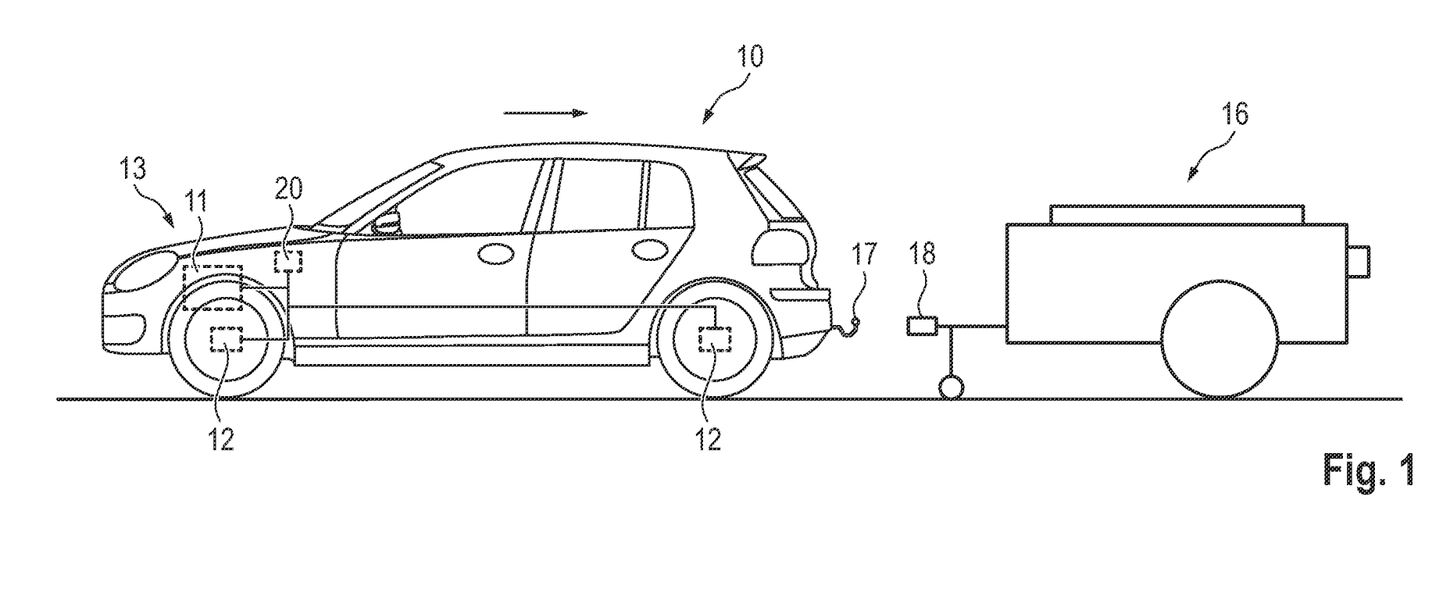
FIG. 1 illustrates a representation showing a method according to some aspects of the present disclosure.

FIG. 1 shows a vehicle 10 with a drive unit 11 for accelerating the vehicle 10 and a braking unit 12 to brake the vehicle 10, under an illustrative embodiment. The vehicle 10 is configured in the form of a passenger car. The drive unit 11 includes the motor and other drive elements of the vehicle 10 and the braking unit 12 includes the friction brake of the vehicle 10. The vehicle 10 further has a vehicle control unit 20 with a setting unit to control the drive unit 11 and the braking unit 12. Aside from that the vehicle 10 has a trailer coupling 17 that can be attached to a tow bar 18 or a coupling section of the tow bar 18 of a trailer 16.

Figure 2:
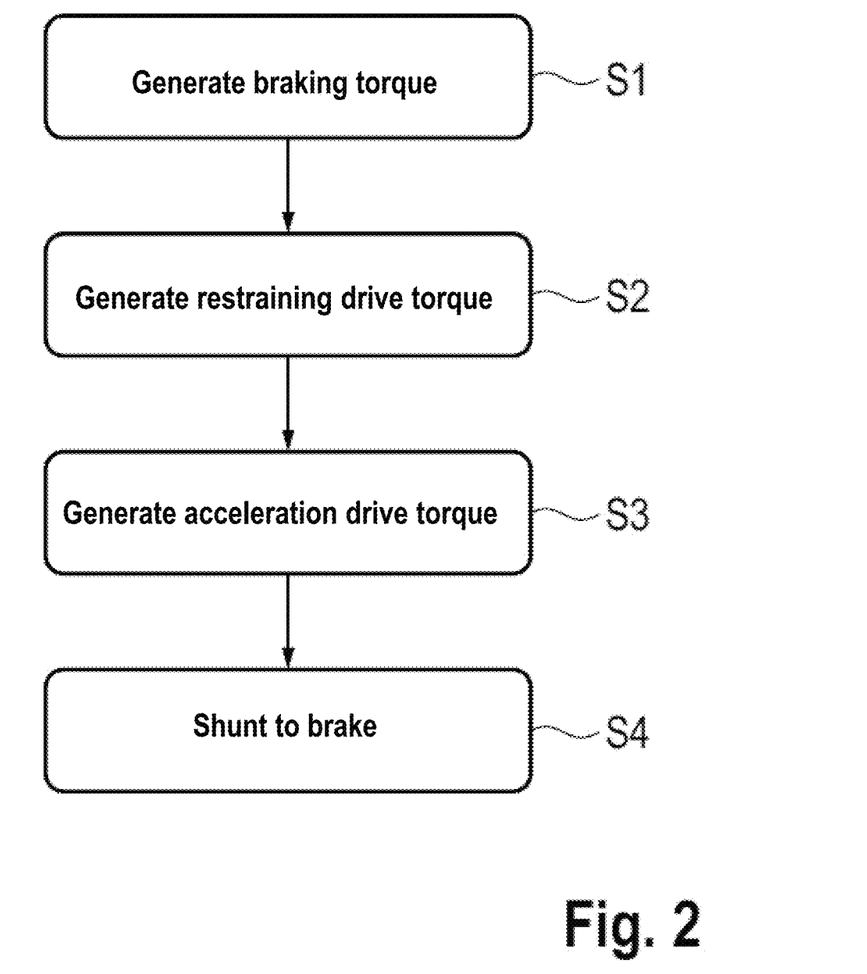
FIG. 2 illustrates a flow diagram showing the method of FIG. 1 according to some aspects of the present disclosure.

With reference to FIG. 1 and FIG. 2 a method disclosed for the restrained movement of the vehicle 10 for coupling the trailer coupling 17 to the tow bar 18 or for coupling the vehicle 10 to the trailer 16. In Step S1, first a braking torque is generated by the braking unit 12. In a Step S2, a restraining drive torque is generated by the drive unit 11. In some examples, Steps S1 and S2 may also be implemented in reverse order, simultaneously, almost simultaneously or at least partially simultaneously. The braking torque and the drive torque may be generated with the same magnitude and different signs, so that they may compensate for, or balance out one another in order to generate a restraining torque in the vehicle 10. In Step S3, an acceleration drive torque is now generated in order to accelerate the vehicle 10 to a predefined shunting speed, in the present example may be approximately 2 km/h. In Step S4, the vehicle 10 is now braked as part of the shunting process, by reducing the drive torque, via the acceleration drive torque or the drive torque that exceeds the drive torque for generating the desired restraining torque. The braking process is implemented in particular if the trailer coupling 17 is on the tow bar 18 and/or the tow bar 18 has approached a predefined distance.

In some examples, the braking torque can be modified, depending on a variably set restraining drive torque and/or depending on a variably set acceleration drive torque. To generate the restraining torque according to Steps S1 and S2, the braking torque may be generated with a greater torque generating gradient than the restraining drive torque. Generating the braking torque may be started chronologically, shortly before generating the restraining drive torque. For reduction of the restraining torque, the braking torque may be reduced with a lower torque reduction gradient than the restraining drive torque. The reduction of the braking torque may be started chronologically after the reduction of the restraining drive torque. The setting unit (not shown) of the vehicle control device 20 may be configured to implement such a method using the existing vehicle components. To implement the method, the vehicle shown in FIG. 1 may be configured with a device 13 that includes the drive unit 11, the braking unit 12 and the setting unit.

Figure 3:
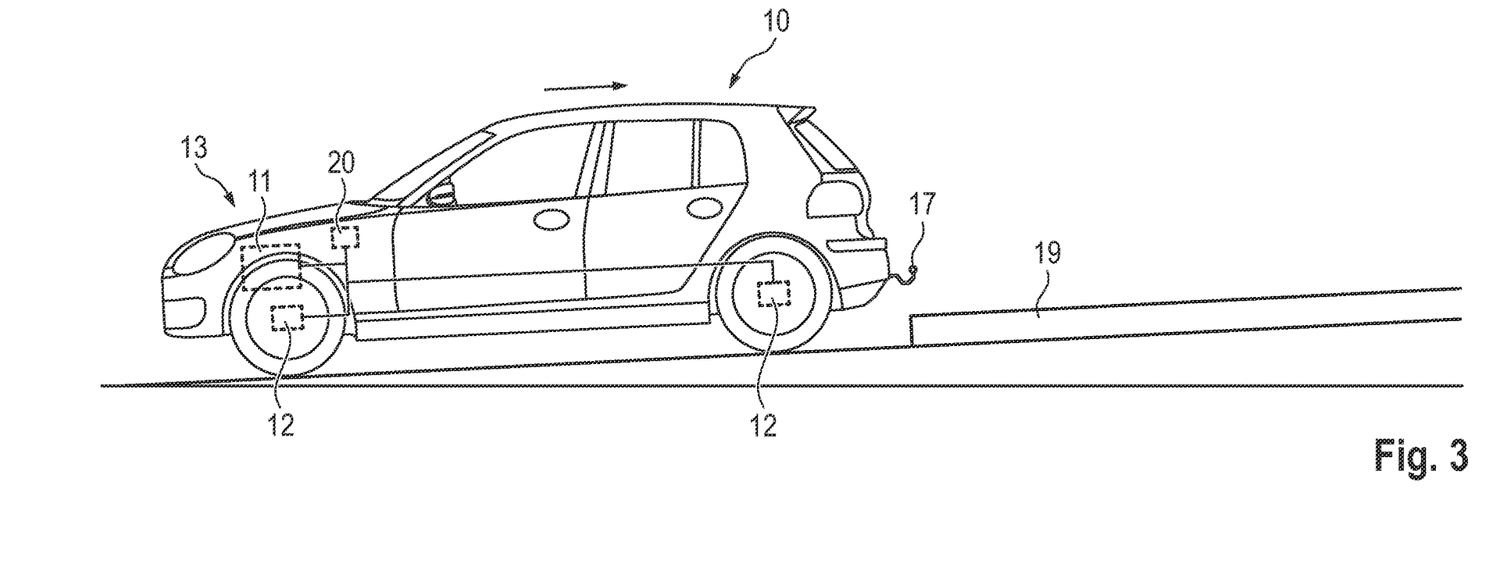
FIG. 3 illustrates a representation showing another method according to some aspects of the present disclosure.

With reference to FIG. 3 another embodiment is described, in which the vehicle 10 is to drive on an inclined plane over a curb or edge stone. In this example, the restraining torque is initially to be set such that the vehicle 10 can accordingly be held solely by the braking torque set in the restraint and thus a withdrawal of the drive torque at any time leads to the vehicle 10 coming to a standstill. The maximum driving speed in this example may be limited to 4 km/h. Here, a possible delay of 0.5 m/s$^2$ is observed. This results in a force of 1050 N, for a vehicle weight of 2100 kg, which results in a restraining torque of approximately 327 Nm. This value should not be kept applicable in order to be able to undertake an adjustment to another vehicle project. If it is assumed that the vehicle, from driving at 4 km/h or 1.1 m/s is to come to a standstill just before the curb stone, braking must be with a delay of 0.5 m/s$^2$. This requires a time of approx. 2.2 s. Depending on the slope in which the vehicle 10 is moving, the restraining torque can be adjusted accordingly so that holding is ensured by simply switching off the drive torque. In the present case the additional torque required in the slope can be calculated as follows. First the downhill slope force is determined with a value of approx. 1580 N. In order to now determine or calculate the desired restraining torque from this, this force can be multiplied with the radius of the wheels and the restraining torque added in the plane. This results in a restraining torque of approx. 818 Nm.

However, the total torque resulting from the restraining drive torque and the acceleration drive torque should not exceed the equivalent of 2 m/s$^2$ in this example. If a user function for the parking assistant requires a maximum speed of 0.5 m/s$^2$, the restraint or the restraining torque is limited to the equivalent of 1.5 m/s$^2$. This corresponds to a restraining torque of approx. 980 Nm. In this way it can be ensured that if in the event of error, the braking torque can no longer be set, and the resulting acceleration does not lead to any uncontrolled and/or uncontrollable movement of the vehicle 10. Furthermore, upon identifying an error event, the drive torque can be shut off as soon as possible thereafter and/or immediately. With such a method the vehicle 10 can also be moved on an inclined plane safely and in a targeted manner to the curb stone 19 and over it. Forces and torques that are created during the drive over the curb stone can, as described above concerning the inclined plane in detail, be calculated analogously and regulated accordingly.

Figure 4:
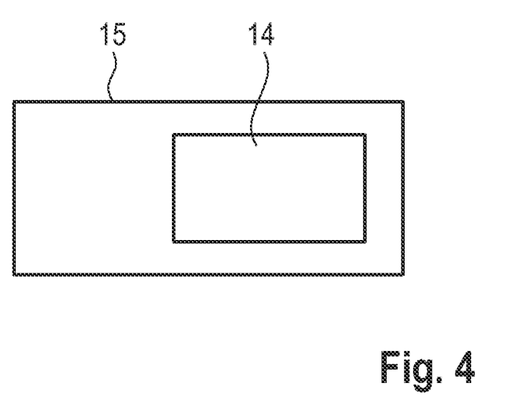
FIG. 4 a block diagram representing a storage means with a computer program product stored thereupon according to some aspects of the present disclosure.

FIG. 4 shows a computer readable, non-volatile storage means 15 with a computer program product 14 stored thereon. The computer program product 14 includes commands that upon the execution of the computer program product 14 by a computer such as the vehicle control device 20 cause the latter to execute the method described above in detail in the vehicle 10.

In addition to the embodiments represented, the present disclosure permits other configuration principles. That means that the present disclosure should not be regarded as being limited to the exemplary embodiments explained with reference to the figures.

LIST OF REFERENCE NUMBERS

10 Vehicle
11 Drive unit
12 Braking unit
13 Device
14 Computer program product
15 Storage means
16 Trailer
17 Trailer coupling
18 Tow bar
19 Curb stone
20 Vehicle control device

The invention claimed is:

1. A method for restrained movement of a vehicle comprising a drive unit for accelerating the vehicle, and a braking unit for braking the vehicle, comprising:
    actively generating a restraining drive torque via the drive unit to counteract an applied braking torque and facilitate controlled vehicle movement during maneuvering operations;
    applying and adjusting the braking torque, via the braking unit, to maintain the restraining drive torque, wherein the restraining drive torque and braking torque are continuously and dynamically modulated during maneuvering operations to regulate vehicle positioning; and
    braking the vehicle by reducing the restraining drive torque while maintaining the braking torque; and
    reducing the restraining torque during the maneuvering operations by dynamically reducing the braking torque and the restraining drive torque, wherein the braking torque is reduced with a smaller torque reduction gradient than the restraining drive torque while the vehicle is actively maneuvering.

2. The method according to claim 1, further comprising accelerating the vehicle via an acceleration drive torque before generating the restraining torque.

3. The method according to claim 2, wherein generating the restraining torque comprises generating the restraining torque when the vehicle is at a standstill before accelerating the vehicle via the acceleration drive torque.

4. The method according to claim 1, further comprising modifying the braking torque depending on a variably set restraining drive torque and/or depending on a variably set acceleration drive torque.

5. The method according to claim 1, further comprising reducing the restraining torque when the vehicle is at a standstill.

6. The method according to claim 5, wherein reducing the restraining torque comprises reducing the braking torque after reducing the restraining drive torque.

7. The method according to claim 1, further comprising accelerating the vehicle using an acceleration drive torque for a driving maneuver to position the vehicle in a predefined holding position at a speed lower than 10 km/h.

8. The method according to claim 1, wherein generating the restraining torque comprises generating the braking torque having a greater torque generating gradient than the restraining drive torque.

9. The method according to claim 1, wherein reducing the restraining torque comprises dynamically adjusting the braking torque based on a slope on which the vehicle is moving.

10. The method according to claim 1, wherein generating the restraining torque comprises generating the braking torque before generating the restraining drive torque.

11. An apparatus for restrained movement of a vehicle, comprising:
   a setting unit;
   a drive unit, operatively coupled to the setting unit, for actively generating a restraining drive torque to counteract an applied braking torque and facilitate controlled vehicle movement during maneuvering operations; and
   a braking unit operatively coupled to the setting unit, for applying and adjusting the braking torque to maintain the restraining drive torque, wherein the restraining drive torque and braking torque are continuously and dynamically modulated during maneuvering operations to regulate vehicle positioning,
   wherein the setting unit is configured to:
      brake the vehicle by reducing the restraining drive torque while maintaining the braking torque; and
      reduce the restraining torque during the maneuvering operations by dynamically reducing the braking torque and the restraining drive torque, wherein the braking torque is reduced with a smaller torque reduction gradient than the restraining drive torque while the vehicle is actively maneuvering.

12. The apparatus according to claim 11, wherein the drive unit is configured to accelerate the vehicle via an acceleration drive torque before the restraining torque is generated.

13. The apparatus according to claim 12, wherein the braking unit is configured to generate the restraining torque by generating the restraining torque when the vehicle is at a standstill before the vehicle is accelerated via the acceleration drive torque.

14. The apparatus according to claim 11, wherein the braking unit is configured to modify the braking torque depending on a variably set restraining drive torque and/or depending on a variably set acceleration drive torque.

15. The apparatus according to claim 11, wherein the braking unit is configured to reduce the restraining torque when the vehicle is at a standstill.

16. The apparatus according to claim 11, wherein the drive unit is configured to accelerate the vehicle using an acceleration drive torque for a driving maneuver to position the vehicle in a predefined holding position at a speed lower than 10 km/h.

17. The apparatus according to claim 11, wherein the braking unit is configured to generate the restraining torque by generating the braking torque having a greater torque generating gradient than the restraining drive torque.

18. The apparatus according to claim 11, wherein the braking unit is configured to reduce the restraining torque by dynamically adjusting the braking torque based on a slope on which the vehicle is moving.

19. The apparatus according to claim 11, wherein the braking unit is configured to generate the restraining torque by generating the braking torque before generating the restraining drive torque.

20. A non-transitory computer-readable medium including executable instructions that are configured to cause restrained movement in a vehicle by performing a method comprising:
   actively generating a restraining drive torque via a drive unit to counteract an applied braking torque and facilitate controlled vehicle movement during maneuvering operations;
   applying and adjusting the braking torque, via a braking unit, to maintain the restraining drive torque, wherein the restraining drive torque and braking torque are continuously and dynamically modulated during maneuvering operations to regulate vehicle positioning; and
   braking the vehicle by reducing the restraining drive torque while maintaining the braking torque; and
   reducing the restraining torque during the maneuvering operations by dynamically reducing the braking torque and the restraining drive torque, wherein the braking torque is reduced with a smaller torque reduction gradient than the restraining drive torque while the vehicle is actively maneuvering.

* * * * *